(No Model.) 2 Sheets—Sheet 1.
M. F. HIGH.
NUT MACHINE.
No. 491,175. Patented Feb. 7, 1893.
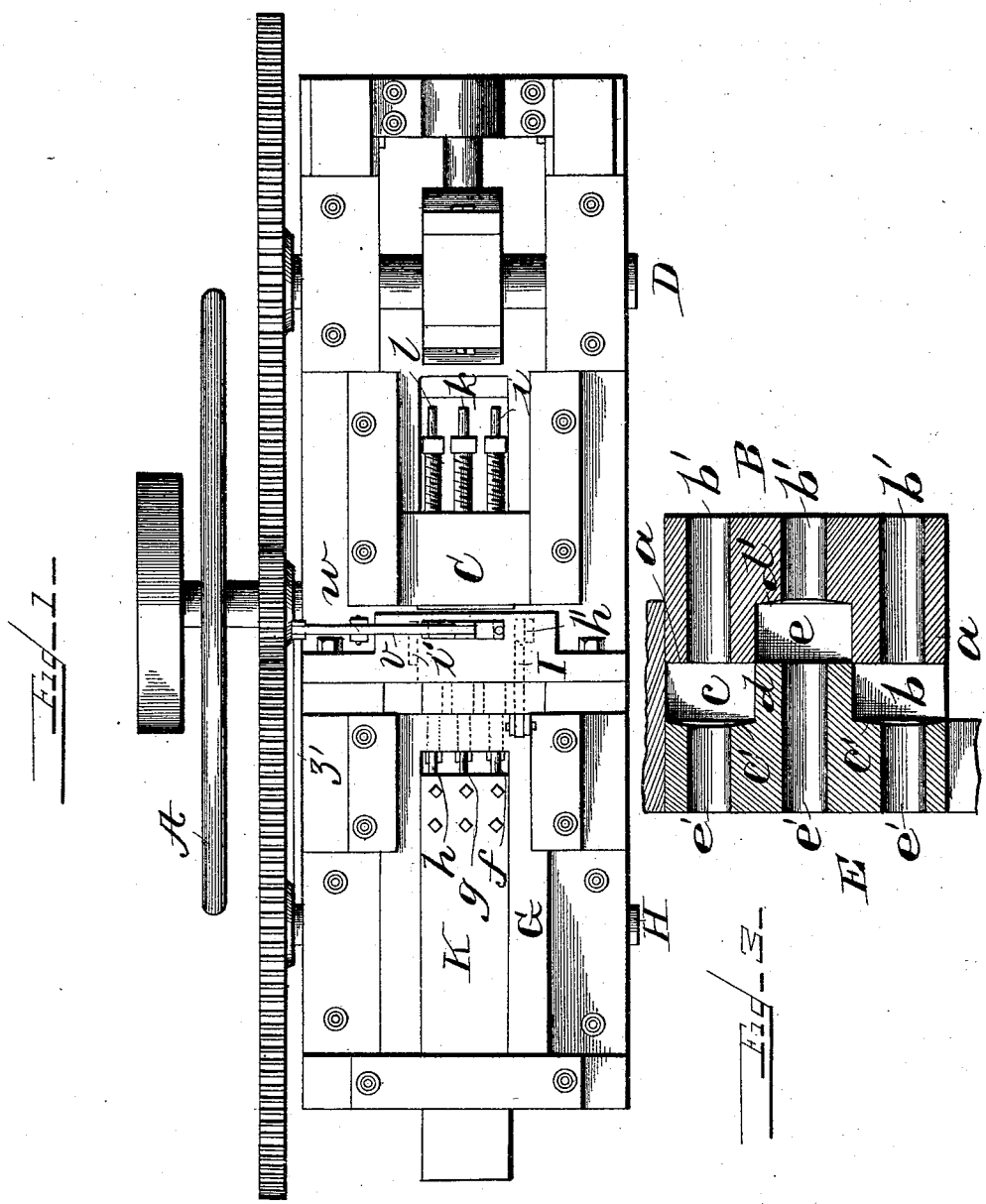
Witnesses
D. A. Tauberschmidt
H. B. Reinohl
Inventor
M. F. High
By D. C. Reinohl
Attorney (No Model.) 2 Sheets—Sheet 2.
M. F. HIGH.
NUT MACHINE.
No. 491,175. Patented Feb. 7, 1893.
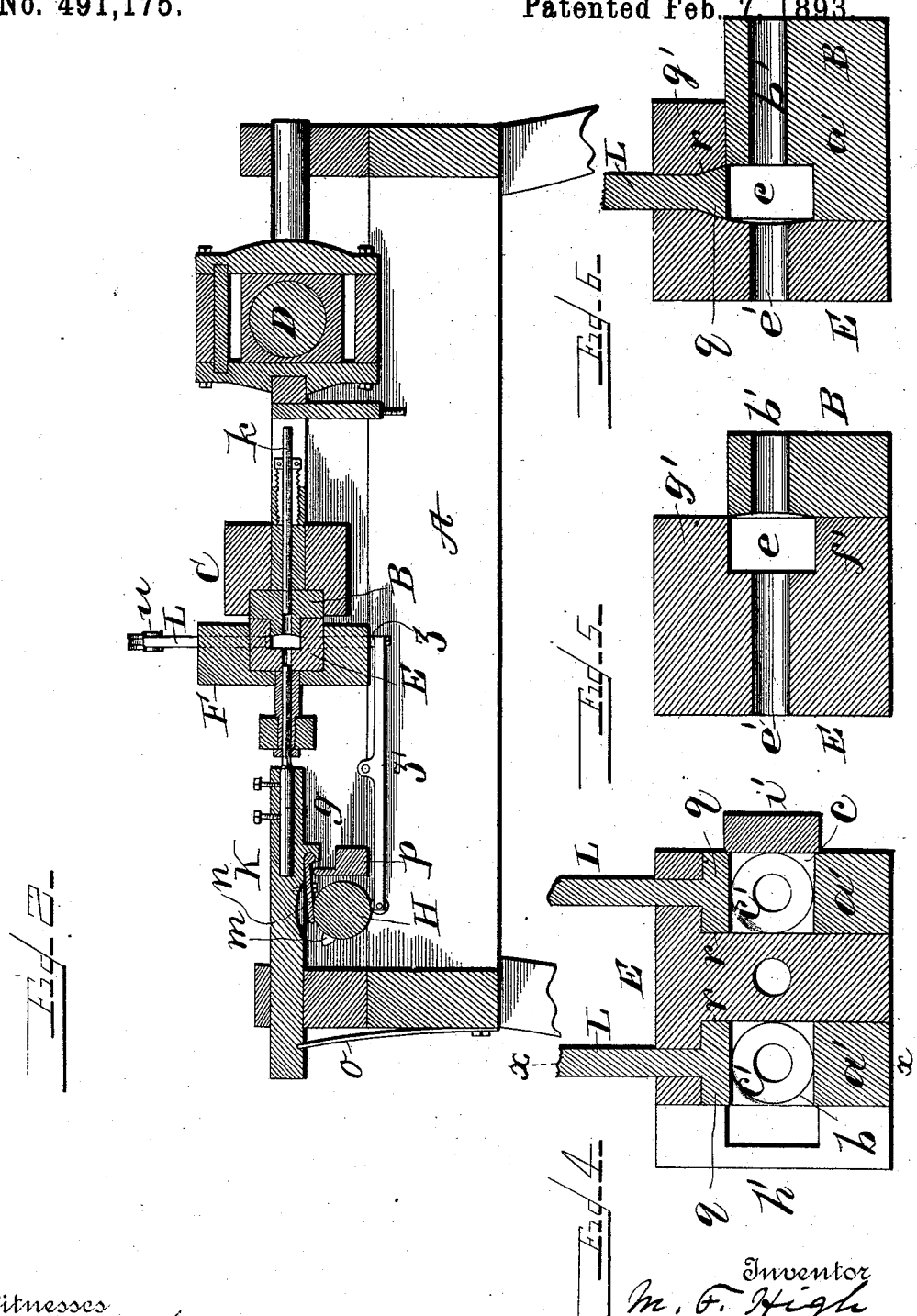
Witnesses
G. W. Taubenschmidt,
H. B. Reinohl
Inventor
M. F. High
By D. C. Reinohl
Attorney

UNITED STATES PATENT OFFICE.

MAURICE F. HIGH, OF LEBANON, PENNSYLVANIA.

NUT-MACHINE.

SPECIFICATION forming part of Letters Patent No. 491,175, dated February 7, 1893.

Application filed July 9, 1892. Serial No. 439,523. (No model.)

*To all whom it may concern:*

Be it known that I, MAURICE F. HIGH, a citizen of the United States, residing at Lebanon, in the county of Lebanon and State of Pennsylvania, have invented certain new and useful Improvements in Machines for Making Nuts; and I do hereby declare the following to be a full, clear, and exact description of the invention, such as will enable others skilled in the art to which it appertains to make and use the same.

My invention relates to means for making two or more hot-pressed nuts per operation of the machine, and has especial reference to dies used for the purpose.

The invention will be hereinafter fully disclosed in the specification and claims.

In the accompanying drawings which form part of this specification. Figure 1 represents a top plan view of a nut making machine, having my invention applied thereto. Fig. 2, a vertical longitudinal section of the same. Fig. 3, a horizontal section of the dies detached from the machine, and on an enlarged scale. Fig. 4, a vertical transverse section of the dies. Fig. 5, a vertical longitudinal section through the center of the dies, and Fig. 6, a similar view on the line $x\ x$ Fig. 4.

Reference being had to the drawings and the letters thereon, A indicates a nut making machine, used only for the purpose of illustrating the application of my invention. Any other approved form of machine may be provided with the dies by adapting its operative parts to the use of the dies. In the present machine the die B, which I designate the male die for the reason that its projections $a\ a$, which form one end of the nut cavities $b\ c$ are first brought into use to sever the bar from which nuts are made, is supported in a reciprocating cross-head C, operated by a shaft D,—and the die E, which I designate the female-die is supported in a fixed die-block F.

G, indicates another reciprocating cross-head, operated by a shaft H and which supports the cutting off bar I which severs the nut-blank in the cavity $b$ of the die E, from the bar of iron from which nuts are made. This die is provided with two nut forming cavities $b,\ c$ and a projection $d$ between said cavities which forms one end of the nut forming cavity $e$ in the male die B.

K indicates a reciprocating bar supported by the cross-head G but moving independently thereof, and supports the piercers or punches $f\ g\ h$, one for each nut cavity in the dies to punch the center of the nuts, the cores or wads of which may be displaced from the dies by suitably mounted dischargers or pushers as $i$, $k$, $l$. The bar K as shown is operated by the shaft H which is provided with a projection $m$, which engages an arm $n$ on the underside of the bar K and projects the bar forward to punch the nuts, and is retracted by a spring $o$. This same shaft as hereinbefore stated also reciprocates the cross-head G, by engaging the transverse bar $p$, as shown in Fig. 2.

The nut cavities $b$, $c$ in the die E are provided with vertically operated dischargers L L which are provided with heads $q\ q$ which fit in recesses or seats $r\ r$ in the upper side of said cavities and form said one side of the die while nuts are being formed in the dies, and subsequently push the nut out of the die by the dischargers being depressed by a suitable mechanism operated from one of the power shafts of the machine. The heads $q\ q$ of the dischargers are preferably tapered as shown to cause them to enter the recesses $r\ r$ readily as they are raised after having expelled the nuts. These dischargers may be operated by a bar $u$ attached to the upper end thereof and said bar connected to a lever $v$ fulcrumed at $w$ and attached to a rod $z$ which is connected to a lever $z'$ which is operated by the shaft H and its projection $m$.

The die B is provided with projections $a'\ a'$ which form the lower side of the nut cavities $b\ c$ and with longitudinal passages $b'\ b'\ b'$ to receive the cores or wads of the nuts and the pickers or pushers $i\ k\ l$ for removing the wads. The discharger or pusher $k$ also pushes the nut out of the cavity $e$ after the die has been separated and the nut carried back by the die B out of contact with the die E. The ends $c'\ c'$ of the cavities $b\ c$ crown the nuts formed in said cavities, and the end $d'$ of the cavity $e$ crowns the nuts made in said cavity.

The die E is provided with longitudinal passages $e'\ e'\ e'$ to receive the piercers $f$, $g$, $h$, a projection $f'$ which forms the lower side of the nut cavity $e$ and a projection $g'$ which overlaps the die B and forms the upper side of said cavity $e$. It will be observed that the cavities $b$ and $c$ are in the same vertical plane and that the cavity $e$ is in advance of the cavities $b$ and $c$; this construction enables the projections $a$ $a$ of the die B to sever the bar from which the nuts are made and separate the blanks for the nut cavities $e$ and $c$ from the bar, while the blank for the nut cavity $b$ is severed from the bar by the reciprocating cutting-off bar I. The bar I is supported on one side of the die E by a suitable lug $h'$, and the bar from which nuts are made is arrested in its passage between the dies B and E by a stop bar $i'$ secured to the opposite side of the die E. By the construction shown each operation of the machine produces three nuts.

Having thus fully described my invention, what I claim is:

1. In a machine for making nuts, a die provided with a movable discharger constituting one side of the nut cavity in the die, while the nut is being formed.

2. In a machine for making nuts, a die provided with a plurality of nut forming cavities and movable dischargers constituting one side of said cavities, while the nuts are being formed.

3. In a machine for making nuts a movable male die and a fixed female die provided with nut forming cavities in different vertical planes, in combination with vertically movable dischargers constituting one side of the cavities in the fixed die, while the nuts are being formed.

4. In a machine for making nuts, a pair of dies provided with nuts forming cavities having recesses in their upper sides, in combination with dischargers having heads filling said recesses. while the nuts are being formed.

In testimony whereof I affix my signature in presence of two witnesses.

MAURICE F. HIGH.

Witnesses:
GEO. I. SELTZER,
SAML. WHITMAN.